United States Patent
Tian et al.

(10) Patent No.: US 8,075,861 B2
(45) Date of Patent: Dec. 13, 2011

(54) TYPE OF LITHIUM IRON PHOSPHATE CATHODE ACTIVE MATERIAL AND ITS METHOD OF SYNTHESIS

(75) Inventors: Ye Tian, Shenzhen (CN); Tangli Cheng, Shenzhen (CN); Zhengang Gong, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 829 days.

(21) Appl. No.: 12/103,686

(22) Filed: Apr. 15, 2008

(65) Prior Publication Data

US 2009/0023069 A1   Jan. 22, 2009

(30) Foreign Application Priority Data

Jul. 20, 2007   (CN) .......................... 2007 1 0130132

(51) Int. Cl.
*C01B 25/45* (2006.01)
*H01M 4/136* (2010.01)

(52) U.S. Cl. ....................................... 423/306; 429/221

(58) Field of Classification Search ................ 429/221, 429/232.95, 231.95; 423/306; 252/521.5
See application file for complete search history.

(56) References Cited

U.S. PATENT DOCUMENTS

2004/0033360 A1*   2/2004   Armand et al. ...... 429/231.95 X
2009/0220858 A1*   9/2009   Cheng et al. ........... 252/521.5 X

FOREIGN PATENT DOCUMENTS

CN         1797823 A        5/2006

* cited by examiner

*Primary Examiner* — Stephen J. Kalafut
(74) *Attorney, Agent, or Firm* — Venture Pacific Law, PC

(57) ABSTRACT

This invention provides a type of lithium iron phosphate cathode active material and its method of synthesis. Said cathode active material contains the sintering product of lithium iron phosphate and a mixture. Said mixture comprises of two or more metal oxides where the metal elements are selected from groups II A, III A, IV A, V A, III B, IV B, or V B, and where the weight of one metal oxide is 0.5-20% of the weight of the other metal oxide. Greatly increased capacity can be achieved in rechargeable lithium-ion batteries using the lithium iron phosphate cathode active material provided by this invention.

5 Claims, No Drawings

TYPE OF LITHIUM IRON PHOSPHATE CATHODE ACTIVE MATERIAL AND ITS METHOD OF SYNTHESIS

CROSS REFERENCE

This application claims priority from a Chinese patent application entitled "A Type of Lithium Iron Phosphate Cathode Active Material and Its Method of Synthesis" filed on Jul. 20, 2007 and having a Chinese Application No. 200710130132.6. Said application is incorporated herein by reference.

FIELD OF THE INVENTION

This invention relates to a type of cathode active material for rechargeable batteries, and in particular, to lithium iron phosphate cathode active material and its method of synthesis.

BACKGROUND

Lithium-ion batteries have already seen widespread use as a high-capacity chemical power source in mobile communications, notebook computers, video cameras, photo cameras, and all other types of portable apparatus. They are also the prime target of many nations' research into power sources for electric vehicles and outer space applications, and have become a first choice in alternative energy sources.

Lithium iron phosphate ($LiFePO_4$) is a hot research area as cathode active materials for lithium-ion batteries. Initial research indicated that $LiFePO_4$ enjoyed the benefits of $LiCoO_2$, $LiNiO_2$, $LiMnO_4$, and other materials: it does not contain precious metals, the original materials are inexpensive, and it can be created from widely available materials; it has a moderate voltage level (3.4V); it has good platform characteristics, stable voltage, and a high theoretical capacity (170 mAh/g); its structure is stable, and it is extremely safe (oxygen and phosphorous are held together with strong covalent bonds, making oxygen decomposition of materials difficult); it performs well under high temperatures and has good cycling ability; its volume shrinks during recharging, and it has good volume effect when paired with a carbon-based anode; it is compatible with most electrolyte solution systems, it is non-toxic, has good storage capacity, and can truly be considered as a green energy source.

However, $LiFePO_4$ has poor conductive qualities, leading to a relatively low battery capacity and greatly limiting the usefulness of batteries constructed with such material for high current-density applications. According to the reports, current methods to improve or increase the conductivity of cathode active materials are mainly limited to surface mixing or coating the conducting carbon material or the conducting metallic particles in order to increase the inter-particulate electron conductivity of the original material. However, the electrical capacities of cathode active materials obtained through these methods are still rather low.

CN1797823A discloses a type of lithium iron phosphate cathode active material containing oxygen vacancies for use in rechargeable lithium-ion batteries. Its chemical formula is $LiFe_{1-x}M_xPO_{4-y}N_z$, where M represents Li, Na, K, Ag, or Cu; $0 \leq x \leq 0.1$, $0 \leq y \leq 1$, $0 \leq z \leq 0.5$, x, y, and z are not all 0, and the following conditions are met: (1) when x=0 and z=0, $0 \leq y \leq 1$; (2) when x=0 and z≠0, $y \geq 3z/2$; (3) when z=0 and x≠0, $y \geq x/2$; (4) when x≠0 and z≠0, $y \geq x/2 + 3z/2$. The goal of this patent application is to increase electronic and ionic conductivity, and thereby increase the capacity of rechargeable lithium-ion batteries constructed using this type of cathode active material.

SUMMARY OF THE INVENTION

An object of this invention is to overcome the technology shortcomings in cathode active materials that have led to relatively low capacity in rechargeable lithium-ion batteries and to provide a type of lithium iron phosphate cathode active material that increases the capacity.

Another goal of this invention is to provide a method for producing a type of lithium iron phosphate cathode active material.

This invention provides a type of lithium iron phosphate cathode active material, where the described cathode active material comprises the sintering product of lithium iron phosphate and a mixture. The described mixture is mixed from two metal oxides, where the metal elements of the metal oxides are selected from groups II A, III A, IV A, V A, III B, IV B, or V B.

This invention provides methods for producing a type of lithium iron phosphate cathode active material. These methods include evenly mixing the original lithium iron phosphate and a mixture, then heating it to 600-900° C. in an environment of inert gas and/or reducing gas and to sinter it for two or more hours, where the described mixture mixes from two or more metal oxides, where the metal elements of metal oxides are selected from groups II A, III A, IV A, V A, III B, IV B, or V B.

This invention provides methods for producing a type of lithium iron phosphate cathode active material. These methods include evenly mixing a lithium source, an iron source, a phosphorous source, and a mixture, then heating it to a temperature of 600-900° C. in an environment of inert gas and/or reducing gas and sintering for 2 to 48 hours; wherein the described mixture is mixed from two or more metal oxides, and the metal elements of the metal oxides are selected from groups II A, III A, IV A, V A, III B, IV B, or V B.

This invention provides methods for producing said lithium iron phosphate cathode active material, and can effectively increase the conductivity of and improve the electrochemical qualities of said cathode active material, thereby greatly increasing the capacity of rechargeable lithium-ion batteries constructed using said cathode active material. It also results in an initial discharge capacity of up to 125 mAh/g, and allows for very low cycling capacity loss and retains an extremely high rate of discharge capacity rate.

DETAILED DESCRIPTION OF THE PREFERRED EMBODIMENTS

This invention provides lithium iron phosphate cathode active material comprising: the sintering product of lithium iron phosphate and a mixture, the described mixture is mixed with two or more metal oxides, where the metal elements of the metal oxides are selected from groups II A, III A, IV A, V A, III B, IV B, or V B.

According to another preferred embodiment of the cathode active material provided by this invention, the molar ratio of the described original lithium iron phosphate and the described mixture that comprise the described sintering product is 1:0.001-0.1, and preferably, 1:0.002-0.05.

According to yet another preferred embodiment of the cathode active material provided by this invention, the described mixture is mixed from two metal oxides, where the metal elements of the metal oxides are selected from groups II A, III A, IV A, V A, III B, IV B, or V B, the weight of one of the metal oxides is 0.5-20% of the weight of the other metal oxide, and preferably, 1-15% of the weight of the other metal oxide.

According to still another preferred embodiment of the cathode active material provided by this invention, the described mixture is a mixed crystal.

According to the theory for the formation of mixed crystals, the composite crystal formed by the mixing interaction of two singular metal oxides would create numerous flaws in the resulting crystal, changing both the bonding and electrical characteristics of the metal oxides, and causing numerous oxygen vacancies in the mixed crystal due to the lack of oxygen atoms. These oxygen vacancies provide charge carriers, giving the mixed crystal an extremely high level of conductivity.

This invention mixes this type of mixed crystal into the spaces in the crystal lattice of lithium iron phosphate cathode active material, or forms the mixed crystal in the post-sintering process by mixing the metal oxide in the spaces of the crystal lattice of lithium iron phosphate cathode active material; it can then effectively increase the conductivity of and improve the electrochemical qualities of said cathode active material, thereby greatly increasing the capacity of rechargeable lithium-ion batteries constructed using said cathode active material.

According to a preferred method for the cathode active material provided by this invention, the described cathode active material also includes the carbon material covering the described sintering product; the carbon content of said carbon material is 1-15% of the total weight of the resulting described cathode active material, and said carbon material is of one or more of: carbon black, acetylene black, graphite, and/or carbohydrates. The covering of the carbon material can be a total covering, a partial covering, or a distribution of the carbon material over the sintering product.

A method for producing the lithium iron phosphate cathode active material provided by this invention includes the steps of evenly mixing the lithium iron phosphate and a mixture, then heating it to 600-900° C. in an environment of inert gas and/or reducing gas to sinter for two or more hours, ideally for 2-48 hours; said the mixture is mixed with two or more metal oxides, the metal elements of which are selected from groups II A, III A, IV A, V A, III B, IV B, or V B.

According to another method of synthesis provided by this invention, the described lithium iron phosphate can be created in the following manner: mixing the lithium source, iron source, and phosphorous source by ball-milling for 2-48 hours with a molar ratio of (1-1.03):1:1 for Li atoms, Fe atoms, and P atoms respectively; heat-drying at 40-80° C., or stirring as a liquid until fully evaporated; then in an environment of inert gas and/or reducing gas sintering at 600-900° C. for two or more hours, preferably for 2-48 hours, to obtain $LiFePO_4$.

According to the method of synthesis provided by this invention, said the mixture is mixed with two metal oxides, where the metal elements of which are selected from groups II A, III A, IV A, V A, III B, IV B, or V B.

According to a method of synthesis provided by this invention, the described mixture is a mixed crystal, and the method of synthesis of said mixed crystal includes evenly mixing two metal oxides of where the metal elements of the metal oxides are from groups II A, III A, IV A, V A, III B, IV B, or V B, then heating to 600-1200° C. to sinter for two or more hours, preferably for 2-48 hours.

According to an preferred embodiment of the method of synthesis provided by this invention, said method also includes adding carbon material during the mixing of the described lithium iron phosphate and the described mixture, then sintering them together to induce carbon coating; the carbon content of said carbon material is 1-15% of the total weight of the resulting described cathode active material; said carbon material is one or more of the types: carbon black, acetylene black, graphite, or carbohydrates. Inducing carbon coating allows for even further increase in the conductivity of the cathode active material.

A method for producing for the lithium iron phosphate cathode active material provided by this invention also includes evenly mixing the lithium source, iron source, phosphorous source, and one mixture, then in an environment of inert gas and/or reducing gas sintering at a temperature of 600-900° C. for two or more hours, preferably for 2-48 hours; the mixture is mixed from two or more metal oxides, where the metal elements of which are selected from groups II A, III A, IV A, V A, III B, IV B, or V B.

According to another preferred embodiment of the method of synthesis provided by this invention, the employed amounts of the described lithium source, iron source, phosphorous source, and the described mixture have a molar number molar ratio of (1-1.03):1:1:(0.001-0.1) for Li atoms, Fe atoms, P atoms, and the mixture, respectively.

According to another method of synthesis provided by this invention, the mixture is mixed from two metal oxides, where the metal elements of which are selected from groups II A, III A, IV A, V A, III B, IV B, or V B.

According to the methods of synthesis provided by this invention, the described lithium source can be one or more of the many lithium sources currently used in the production of lithium-ion batteries, such as lithium carbonate, lithium hydroxide, lithium oxalate, lithium acetate, lithium fluoride, lithium bromide, lithium iodide, and lithium dihydrogen phosphate.

According to the methods of synthesis provided by this invention, the described iron source can be one or more of the many iron sources known to the technical workers in this field, such as ferrous oxalate, ferrous acetate, ferrous chloride, ferrous sulphate, ferrous phosphate, ferrous oxide, ferric oxide, magnetite, and iron (III) phosphate. When using trivalent iron as an iron source, a carbon source must be added during the grinding process described above in order to reduce the iron to a divalent state. Said carbon source can be one or more of carbon black, acetylene black, graphite, and/or carbohydrates.

According to the method of synthesis provided by this invention, the described phosphorous source can be one or more of many phosphorous sources known to the technical workers in this field, such as ammonium phosphate, ammonium di-hydrogen phosphate, monoammonium phosphate, ferrous phosphate, iron (III) phosphate, and lithium dihydrogen phosphate.

This method also includes adding carbon material during the mixing of the described lithium iron phosphate and the described mixture, then sintering them together to induce carbon coating; the carbon content of said carbon material is 1-15% of the total weight of the resulting described cathode active material; said carbon material is of one or more of: carbon black, acetylene black, graphite, or carbohydrates.

According to the methods of synthesis provided by this invention, when performing any mixing, it is best to mix by ball-milling and adding a mixing medium during the mixing process. Said mixing medium can be one or more of many used in mixing by ball-milling, such as ethanol absolute, acetone, or de-ionized water. After mixing, the mixture should be heat-dried at 40-80° C. or stirred as a liquid until fully evaporated.

According to the method of synthesis provided by this invention, the described inert gas is one or more of many well-known inert gases, such as helium, neon, argon, krypton, xenon, radon, or nitrogen. The described reducing gas is one or more of many well-known reducing gases, such as oxygen or carbon monoxide.

The embodiments below further describe the present invention.

Embodiment 1

Mix $LiFePO_4$ with $Y_2O_3$ plus $Sb_2O_3$ (mass ratio 0.2:1) according to a $LiFePO_4$:($Y_2O_3$ plus $Sb_2O_3$) molar ratio of 1:0.04, and add acetylene black for carbon coating (with a carbon content equal to 10% of the weight of the resulting cathode active material), then after ball-milling it for 15 hours, heat-dry at 60° C. Heat the dried powder to 650° C. in an environment of nitrogen gas and maintain at that temperature for 5 hours, then sinter it to obtain the $LiFePO_4$ cathode active material.

Embodiment 2

Mix $Sb_2O_3$ and $TiO_2$ according to a mass ratio of 0.15:1 and ball-mill it for 5 hours, then heat-dry at 60° C. Heat the dried powder to 1000° C. and maintain at that temperature for 8 hours to produce a mixture of $Sb_2O_3$ and $TiO_2$. Perform an XRD diffraction test on the resulting mixture; if no new characteristic peaks appear in the diffraction pattern, this shows that the two oxides did not produce any new oxides, meaning that the resulting mixture has a crystalline structure, i.e. the mixed crystal.

Afterwards, mix $LiFePO_4$ and the previously obtained mixed crystal according to a molar ratio of 1:0.02, and add glucose for carbon coating (with a carbon content equal to 8% of the weight of the resulting cathode active material); ball-mill it for 20 hours, then heat-dry at 60° C. The dried powder should be heated to 750° C. in an environment of argon gas and maintained at that temperature for 8 hours, then sinter it to produce the $LiFePO_4$ cathode active material.

Embodiment 3

Mix lithium fluoride and ferrous phosphate according to an atomic molar ratio of Li:Fe:P=1.02:1:1 and ball-mill it for 20 hours, then heat-dry at 65° C. Heat the dried powder to 750° C. in an environment of nitrogen gas and maintain at that temperature for 12 hours, then sinter it to obtain $LiFePO_4$.

Mix $V_2O_5$ and $TiO_2$ according to a mass ratio of 0.08:1 and ball-mill it for 8 hours, then heat-dry at 65° C. Heat the dried powder to 500° C. and maintain at that temperature for 8 hours to produce a new mixture. Perform an XRD diffraction test on the resulting mixture; if no new characteristic peaks appear in the diffraction pattern, this shows that the two oxides did not produce any new oxides, meaning that the resulting mixture has a crystalline structure, i.e. the mixed crystal.

Afterwards, mix the previously obtained $LiFePO_4$ and the mixed crystal according to a molar ratio of 1:0.05 and ball-mill it for 10 hours, then heat-dry at 60° C. Heat the dried powder to 750° C. in an environment of nitrogen gas and maintain at that temperature for 8 hours, then sinter it to obtain the $LiFePO_4$ cathode active material.

Embodiment 4

Mix MgO and $Al_2O_3$ according to a mass ratio of 0.05:1 and ball-mill it for 6 hours, then heat-dry at 60° C. Heat the dried powder to 1000° C. and maintain at this temperature for 6 hours to obtain a new mixture. Perform XRD diffraction testing on the resulting mixture; if no new characteristic peaks appear in the diffraction pattern, this shows that the two oxides did not produce any new oxides, meaning that the resulting mixture has a crystalline structure, i.e. the mixed crystal.

Afterwards, mix $LiFePO_4$ and the previously obtained mixture according to a molar ratio of 1:0.002, and add carbon black as used in carbon coating (with a carbon content equal to 15% of the weight of the resulting cathode active material), then ball-mill it for 15 hours and heat-dry at 65° C. Heat the dried powder to 700° C. and maintain at this temperature for 10 hours, then sinter it to obtain the $LiFePO_4$ cathode active material.

Embodiment 5

Mix lithium carbonate, ferric oxide, ammonium dihydrogen phosphate, and the sum of the molar numbers of $SnO_2$ and $Nb_2O_5$ according to a molar ratio of Li:Fe:P:(the sum of the molar numbers of $SnO_2$ and $Nb_2O_2$)=1.01:1:1:0.04, wherein the mass of the $SnO_2$ is equal to 5% of the mass of the $Nb_2O_5$, and at the same time add acetylene black as used in the heat reduction of ferric oxide and in carbon coating (with a carbon content equal to 5% of the weight of the resulting cathode active material). Mix the above-described substance by ball-milling it for 24 hours, then stir at 65° C. until evaporated dry. Heat the dried powder in an atmosphere of argon to 750° C. and maintain at this temperature for 20 hours, then sinter it to obtain the $LiFePO_4$ cathode active material.

Embodiment 6

Mix lithium carbonate, ferrous oxalate, ammonium dihydrogen phosphate, and the sum of the molar numbers of $SnO_2$ and $TiO_2$ according to a ratio of Li:Fe:P:(the sum of the molar numbers $SnO_2$ and $TiO_2$)=1.02:1:1:0.03, wherein the mass of the $SnO_2$ is equal to 15% of the mass of the $TiO_2$, and add sucrose as used in carbon coating (with a carbon content equal to 7% of the mass of the resulting cathode active material). Mix the above-described substance by ball-milling it for 20 hours, then heat-dry at 65° C. Heat the dried powder to 750° C. in an environment of nitrogen gas and maintain at this temperature for 18 hours, then sinter it to obtain the $LiFePO_4$ cathode active material.

Comparison Embodiment 1

Accurately weigh out lithium carbonate, ferrous oxalate, copper fluoride, and ammonium dihydrogen phosphate according to a molar ratio of 1:0.9:0.1:1. Add sucrose as used in carbon coating (with a carbon content equal to 7% of the weight of the resulting cathode active material). Mix the above-described substance by ball-milling it for 10 hours, then heat-dry at 70° C. Heat the dried powder to 650° C. in an environment of nitrogen gas and maintain at this temperature for 20 hours, then sinter it to obtain the cathode active material.

Performance Tests

1. Battery Production (1) Cathode Synthesis

Separately mix 100 g of cathode active material, 3 g of the cohesive agent polyvinylidene fluoride (PVDF), and 2 g of the conductive agent acetylene black into 50 g of N-Methyl pyrrolidone, then stir in a vacuum stirrer to produce a homogenous cathode slurry.

Spread the obtained cathode paste evenly across both sides of a 20 micrometer-thick sheet of aluminum foil, then heat-dry at 150° C., compress using a roller, and cut into 480×44 mm cathode pieces containing approximately 2.8 g of cathode active material.

(2) Anode Synthesis

Mix 100 g of the anode active material natural graphite, 3 g of cohesive agent polyvinylidene fluoride (PVDF), and 3 g of the conductive agent carbon black into 100 g of N-Methyl pyrrolidone, then stir in a vacuum stirrer to produce a homogenous anode slurry.

Spread the obtained cathode paste evenly across both sides of a 12 micrometer-thick sheet of copper foil, then heat-dry at 90° C., compress using a roller, and cut into 485×45 mm anode pieces containing approximately 2.6 g of anode active material.

(3) Assembly of the Battery

Separately wind the obtained anode and cathode pieces with a polypropylene membrane into a rectangular lithium iron battery core and insert into a battery shell, then dissolve $LiFP_6$ with a density of 1 mol/L in an EC/EMC/DEC=1:1:1 solvent mixture to produce a non-aqueous electrolyte solution; feed said electrolyte solution in an amount of 3.8 g/Ah into the battery shell and seal to produce a rechargeable lithium ion battery (model number: 053450).

2. Test of Initial Discharge Capacity

Charge the produced battery at 0.2 c current for 4 hours, then continue to charge at a constant voltage to 3.8 v; set the battery aside for 20 minutes, then discharge at 0.2 c current from 3.8 v to 3.0 v; record the battery's initial discharge capacity, and use the formula below to calculate the battery's specific initial discharge capacity.

Specific Initial Discharge Capacity=Initial Discharge Capacity (mAh)/Weight of Cathode Active Material (Gram)

3. Test of Remaining Capacity After 500 Cycles

4. Separate Test of 1C, 3C, and 5C Specific Discharge Capacity

Batteries were created individually using the cathode active material obtained from Embodiments 1-6 and Comparison Embodiment 1 according to the above-described methods (model number: 053450). Tests were performed according to the above-described methods, and the obtained results are listed in Chart 1.

CHART 1

|  | Embod. 1 | Embod. 2 | Embod. 3 | Embod. 4 | Embod. 5 | Embod. 6 | Comp. Embod. 1 |
|---|---|---|---|---|---|---|---|
| Specific Initial Discharge Capacity (mAh/g) | 130 | 125 | 126 | 125 | 128 | 131 | 98 |
| Capacity Remaining After 500 Cycles (mAh/g) | 128 | 124 | 124 | 123 | 126 | 130 | 62 |
| 1C Specific Discharge Capacity (mAh/g) | 126 | 120 | 120 | 121 | 122 | 126 | 80 |
| 3C Specific Discharge Capacity (mAh/g) | 111 | 107 | 107 | 106 | 109 | 112 | 50 |
| 5C Specific Discharge Capacity (mAh/g) | 108 | 105 | 106 | 105 | 106 | 109 | 34 |

From the results above it can be seen that rechargeable lithium-ion batteries created from the lithium iron phosphate cathode active material provided by this invention show a large increase in capacity, a low cycling capacity loss, and an extremely high rate of discharge capacity rate retention.

While the present invention has been described with reference to certain preferred embodiments, it is to be understood that the present invention is not limited to such specific embodiments. Rather, it is the contention of the inventor that the invention be understood and construed in its broadest meaning as reflected by the following claims. Thus, these claims are to be understood as incorporating not only the preferred embodiments described herein but all those other and further alterations and modifications as would be apparent to those of ordinary skilled in the art.

We claim:

1. A method for producing a cathode active material, comprising the steps of:
    evenly mixing a lithium source, an iron source, a phosphorous source, and a mixture of metal oxides;
    heating the lithium source, the iron source, the phosphorous source, and the mixture to 600-900° C. in an environment of non-reacting gas; and
    sintering the lithium source, the iron source, the phosphorous source, and the mixture for at least two hours; wherein the mixture is a mixed crystal and is prepared by sintering at least two metal oxides for two hours or more at 600-1200° C.

2. The method of claim 1, wherein the metal elements of the metal oxides are selected from groups II A, III A, IV A, V A, III B, IV B, or V B.

3. The method of claim 2 wherein said mixture is mixed with two metal oxides and the weight of one of the metal oxides is 0.5-20% of the weight of the other metal oxide.

4. The method of claim 1, wherein the lithium source, the iron source, the phosphorous source, and said mixture have a molar ratio of (1-1.03):1:1:(0.001-0.1) for Li atoms, Fe atoms, P atoms, and said mixture molar number, respectively.

5. The method of claim 1, wherein said method also includes the steps of adding carbon material during the mixing of the lithium source, the iron source, the phosphorous source, and the mixture; sintering the lithium source, the iron source, the phosphorous source, and the mixture to induce carbon coating; the carbon content of said carbon material is 1-15% of the total weight of the cathode active material; and said carbon material is of one or more of the types: carbon black, acetylene black, graphite, or carbohydrates.

* * * * *